United States Patent
Sun et al.

(10) Patent No.: US 8,078,185 B2
(45) Date of Patent: Dec. 13, 2011

(54) USER GROUP-BASED ADAPTIVE SOFT FREQUENCY REUSE METHOD TO MITIGATE DOWNLINK INTERFERENCE FOR WIRELESS CELLULAR NETWORKS

(75) Inventors: Hongmei Sun, Beijing (CN); Hua Yang, Shanghai (CN); Shilpa Talwar, Santa Clara, CA (US); Nageen Himayat, Fremont, CA (US); Clark Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 12/415,924

(22) Filed: Mar. 31, 2009

(65) Prior Publication Data

US 2010/0248728 A1      Sep. 30, 2010

(51) Int. Cl.
| | |
|---|---|
| *H04W 72/00* | (2009.01) |
| *H04B 1/38* | (2006.01) |
| *H04B 7/00* | (2006.01) |
| *H04B 7/212* | (2006.01) |
| *H04B 1/00* | (2006.01) |
| *H04L 5/22* | (2006.01) |
| *H04L 12/16* | (2006.01) |
| *H04L 27/28* | (2006.01) |
| *H04J 1/00* | (2006.01) |

(52) U.S. Cl. ........ 455/450; 375/147; 375/141; 375/260; 370/330; 370/329; 370/260; 370/343; 455/452.1; 455/452.2; 455/561; 455/522

(58) Field of Classification Search .......... 455/450–453, 455/446–447, 464; 370/336–337, 329–331, 370/319–326, 314, 343–345
See application file for complete search history.

(56) References Cited

U.S. PATENT DOCUMENTS

| | | | | |
|---|---|---|---|---|
| 2009/0040978 | A1* | 2/2009 | Kim et al. | 370/329 |
| 2009/0069043 | A1* | 3/2009 | Roh et al. | 455/522 |
| 2009/0181691 | A1* | 7/2009 | Kotecha et al. | 455/452.1 |
| 2009/0279498 | A1* | 11/2009 | Li et al. | 370/329 |
| 2010/0027502 | A1* | 2/2010 | Chen et al. | 370/330 |
| 2010/0118824 | A1* | 5/2010 | Ihm et al. | 370/329 |

* cited by examiner

*Primary Examiner* — Kent Chang
*Assistant Examiner* — Keith Fang
(74) *Attorney, Agent, or Firm* — Carrie A. Boone, P.C.

(57) ABSTRACT

A novel soft fractional frequency reuse (FFR) technique is disclosed. The novel FFR technique includes reuse partition and power restriction, dynamic user grouping, channel quality indicator feedback based on reuse, and a user group-based interference aware scheduler. The FFR technique reduces co-channel interference for cell edge users.

19 Claims, 11 Drawing Sheets

Figure 7

| number of cells | 19 cells, with 3 sectors per cell (with wrapping around) |
|---|---|
| number of sectors/cell | 3 |
| site-to-site distance | 1.5 km |
| carrier frequency | 2.5 GHz |
| user number | 10 users/sector (uniformly distributed) |
| permutation mode | AMC |
| MIMO | 2 x 2, with rank adaptation (STBC/SM) with MMSE-aware receiver |
| MCS | QPSK (1/2, 3/4), 16QAM (1/2, 3/4), 64QAM (2/3, 3/4, 5/6) (no repetition) |
| target PER | 0.1 |
| strong interference # | 14 |
| channel model | PedB 3kmph, channel-mix, vehA-120 |
| CQI feedback | 5ms delay, full feedback/partial feedback (best-M) |
| HARQ | chase-combing with 4 retransmission with 4 frames of retransmission delay |
| RB size | 48 sub-carriers x 6 symbols |
| frame length | 5 ms |
| scheduler | proportional fairness |

Figure 8

| scheme | band ratio of reuse 3 (w1+w2+w3)/w | gross cell SE (bps/Hz) (gain over reuse 1) | 5% user throughput (kbps) (gain over reuse 1) | 10% user throughput (kbps) (gain over reuse 1) |
|---|---|---|---|---|
| reuse 1 baseline | 0 (fully reuse 1) | 5.92 | 459 | 574 |
| soft reuse-2 group (fixed percentage-based static user grouping) | 75% | 5.02 (- 15%) | 593 (+ 29%) | 696 (+ 22%) |
| soft reuse-2 group (fixed percentage-based dynamic user grouping) | 75% | 5.24 (- 11%) | 723 (+ 57%) | 849 (+ 48%) |
| adaptive soft reuse (threshold-based dynamic user grouping) | 75% | 5.3 (- 10%) | 761 (+ 66%) | 900 (+ 58%) |

Figure 10

| scheme | band ratio of reuse 3 (w1+w2+w3)/w | gross cell SE (bps/Hz) (gain over reuse 1) | 5% user throughput (kbps) (gain over reuse 1) | 10% user throughput (kbps) (gain over reuse 1) | CQI overhead per user |
|---|---|---|---|---|---|
| reuse 1 baseline | 0 (fully reuse 1) | 5.67 | 475 | 565 | 5 |
| adaptive soft reuse (fixed percentage-based dynamic user grouping) (2 user group) | 75% | 5.13 (−10%) | 750 (+58%) | 828 (+47%) | 5.1 |

USER GROUP-BASED ADAPTIVE SOFT FREQUENCY REUSE METHOD TO MITIGATE DOWNLINK INTERFERENCE FOR WIRELESS CELLULAR NETWORKS

TECHNICAL FIELD

This application relates to wireless cellular networks and, more particularly, to advancements in adaptive soft frequency reuse.

BACKGROUND

WiMAX, short for worldwide interoperability for microwave access, is currently defined by the Institute of Electrical and Electronics Engineers, or IEEE, 802.16-series specification. Mobile WiMAX, under 802.16e, permits broadband wireless access for mobile users. Under Mobile WiMAX, orthogonal frequency division multiple access (OFDMA) is used to multiplex different users with time-frequency resource allocation in the same transmission frame. Each user is allocated one or more sub-channels made up of a fixed number of narrowband sub-carriers. Because the sub-carriers are orthogonal to one another, interference levels are generally low between them in a single cell/sector.

Where the same sub-carriers are in the same time slots within nearby cells/sectors, collisions (interference) may occur. Under the 802.16e standard, the same frequency band may be used in other, usually non-adjacent cells/sectors, known as fractional frequency reuse (FFR). Under FFR, cell edge users are distinguished from cell center users, with cell edge users operating with a fraction of the available sub-channels (known as frequency reuse 3 or R3) while the cell center users operate with all available sub-channels (known as frequency reuse 1 or R1).

It had been shown that frequency reuse 1 typically provides much better spectrum efficiency than frequency reuse 3. Therefore, future orthogonal frequency division multiplexing (OFDM) based cellular systems (such as WiMAX and LTE, short for long-term evolution) are evolving toward frequency reuse 1 in order to maximize the spectral efficiency. However, in systems deployed with frequency reuse 1, cell edge users will suffer severe performance degradation due to very strong co-channel interference (CCI) from neighboring sectors/cells, which leads to poor cell coverage.

Fractional frequency reuse enables multiple frequency reuse factors in one system, and allows users to choose suitable reuse value according to their channel quality. Fractional frequency reuse thus helps the system yield high spectrum efficiency while maintaining decent coverage.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 7 is a table with key simulation settings and scenarios used to evaluate the FFR method of FIG. 1, according to some embodiments;

FIG. 8 a table that lists the performance of adaptive soft reuse with full CQI feedback, according to some embodiments;

FIG. 10 is a table of the performance of adaptive soft reuse technique, assuming partial feedback available at the base station, according to some embodiments.

DETAILED DESCRIPTION

In accordance with the embodiments described herein, a novel soft fractional frequency reuse (FFR) technique is disclosed. The novel FFR technique includes reuse partition and power restriction, dynamic user grouping, channel quality indicator (CQI) feedback based on reuse, and a user group-based interference aware scheduler.

In the following description, the FFR technique described herein employs a system supporting reuse 1 and reuse 3 as an example. Nevertheless, the FFR technique disclosed herein may be easily extended to systems supporting FFR with other combinations of reuse factors. All components may be applied in FFR with hard reuse in similar ways.

Figure 1:
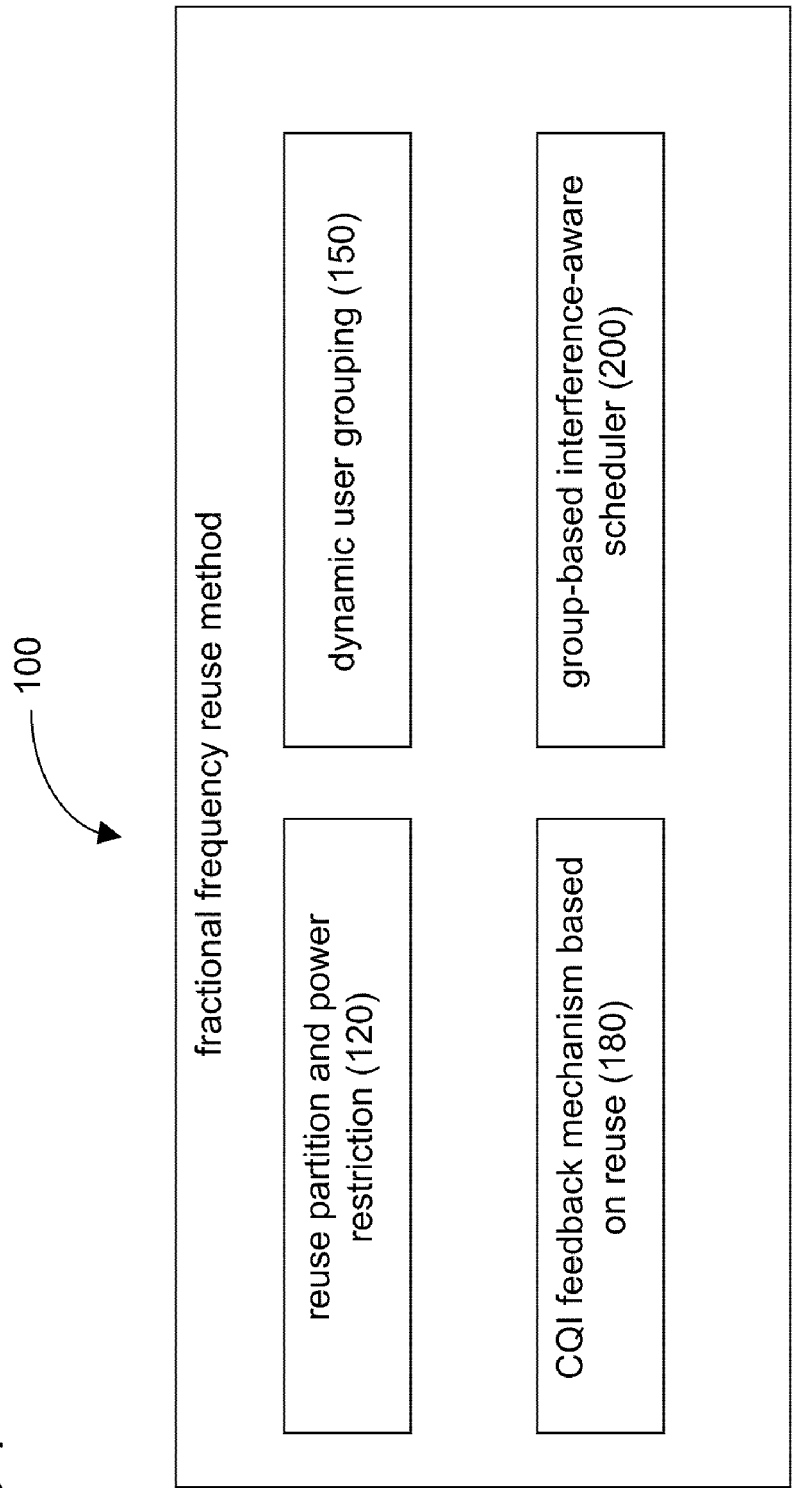
FIG. 1 is a block diagram of a fractional frequency reuse method, according to some embodiments.

FIG. 1 is a simplified block diagram of a novel soft fractional frequency reuse (FFR) method 100, according to some embodiments. The FFR method 100 includes four distinct functions: a reuse partition and power restriction module 120, a dynamic user grouping module 150, a CQI feedback mechanism based on reuse 180, and a group-based interference-aware scheduler 200.

The FFR method 100 is innovative in several respects over the prior art. The reuse partition and power restriction module 120 sets up a reuse partition, in which reuse band 1 is preserved to serve users with good channel quality. The dynamic user grouping module 150 groups users based on a degree of satisfaction of each user, i.e., whether its quality of service requirement has been met. The user grouping is dynamically adjusted to optimally reflect the current status of users so that allocating more resources than required by the user is avoided. In addition, the number of user groups may be dynamically adjusted, for example, between two and three. When there are users with the best channel quality, grouping these users out to form three user groups may help the system to achieve better performance in that these users have margin to endure strong co-channel interference induced by FFR.

With the newly designed CQI feedback mechanism 180, users and base stations are both aware of different reuse factors. The CQI feedback mechanism 180 is therefore designed to be aware of reuse partitioning and user grouping information. Using the CQI feedback mechanism 180, the FFR method 100 avoids introducing extra overhead in the system, in some embodiments. The user group-based interference-aware resource scheduler 200 provides dynamic reuse factor selection among different user groups and may handle uneven user distribution by borrowing resource from other reuse groups within a sector. Each of the functional aspects of the FFR method 100 is described in more detail in the following sections.

Reuse Partition and Power Restriction 120

Figure 2:
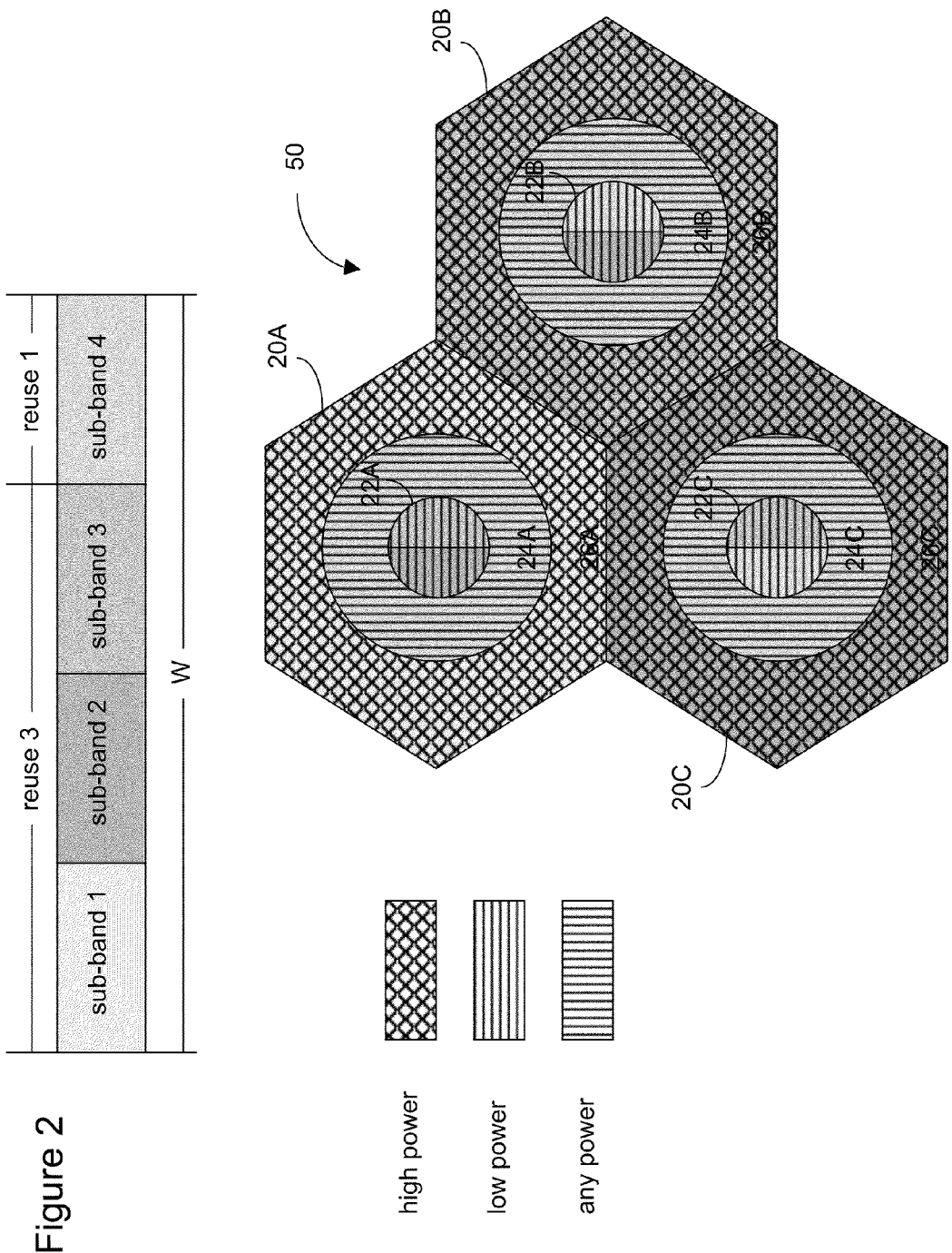
FIG. 2 is a reuse distribution in four sub-bands and a wireless network with three cells, used to illustrate operations of the FFR method of FIG. 1, according to some embodiments.

As shown in FIG. 1, part of the FFR method 100 is reuse partition and power restriction 120. FIG. 2 shows two reuse factors, reuse 1 and reuse 3, being supported by splitting an entire bandwidth W into four frequency sub-bands: sub-band 1, sub-band 2, sub-band 3, and sub-band 4. Three of the sub-bands are used for reuse 3 while one sub-band is used for reuse 1. The process of splitting up the bandwidth is known herein as "reuse partitioning" and each frequency sub-band corresponds to one partition group.

A vector $\vec{W}:[W_1,W_2,W_3,W_{123}]$ may represent the size of the four partition groups, each of which may be loaded with a different downlink transmission power. (Downlink transmission power is addressed in more detail, below.) The sum of all partitions equals the size of the total bandwidth, W, as:

$$\Sigma W_i + W_{123} = W,$$

with i,=1,2,3. The partition groups $W_1$, $W_2$, and $W_3$ need to be equal, i.e., $W_1=W_2=W_3$, to maintain the orthogonality of this partition among different sectors/cells. The corresponding downlink transmission power vectors of three neighboring sectors may be described mathematically as:

$$P=[P_{High},P_{Low},P_{Low},P_{Reuse1}] \quad \text{Sector1}$$

$$P=[P_{Low},P_{High},P_{Low},P_{Reuse1}] \quad \text{Sector2}$$

$$P=[P_{Low},P_{Low},P_{High},P_{Reuse1}] \quad \text{Sector3}$$

In addition to reuse partitioning, the reuse partition and power restriction module 120 of the FFR method 100 also determines power restriction, in some embodiments. A power boosting factor may be denoted as follows:

$$PL=P_{High}/P_{Low}$$

where $P_{High}$ is a first power level, $P_{Low}$ is a second power level, where it is assumed that $P_{High}>P_{Low}$. For small cells, $P_{Reuse1}$ may be any power value since this will not affect the signal-to-interference ratio (SIR) on the reuse 1 sub-band. To decrease the total number of power levels, $P_{Reuse1}$ may be either $P_{Low}$ or $P_{High}$. Soft reuse may be achieved by adjusting the power-boosting factor, PL.

Figure 3:
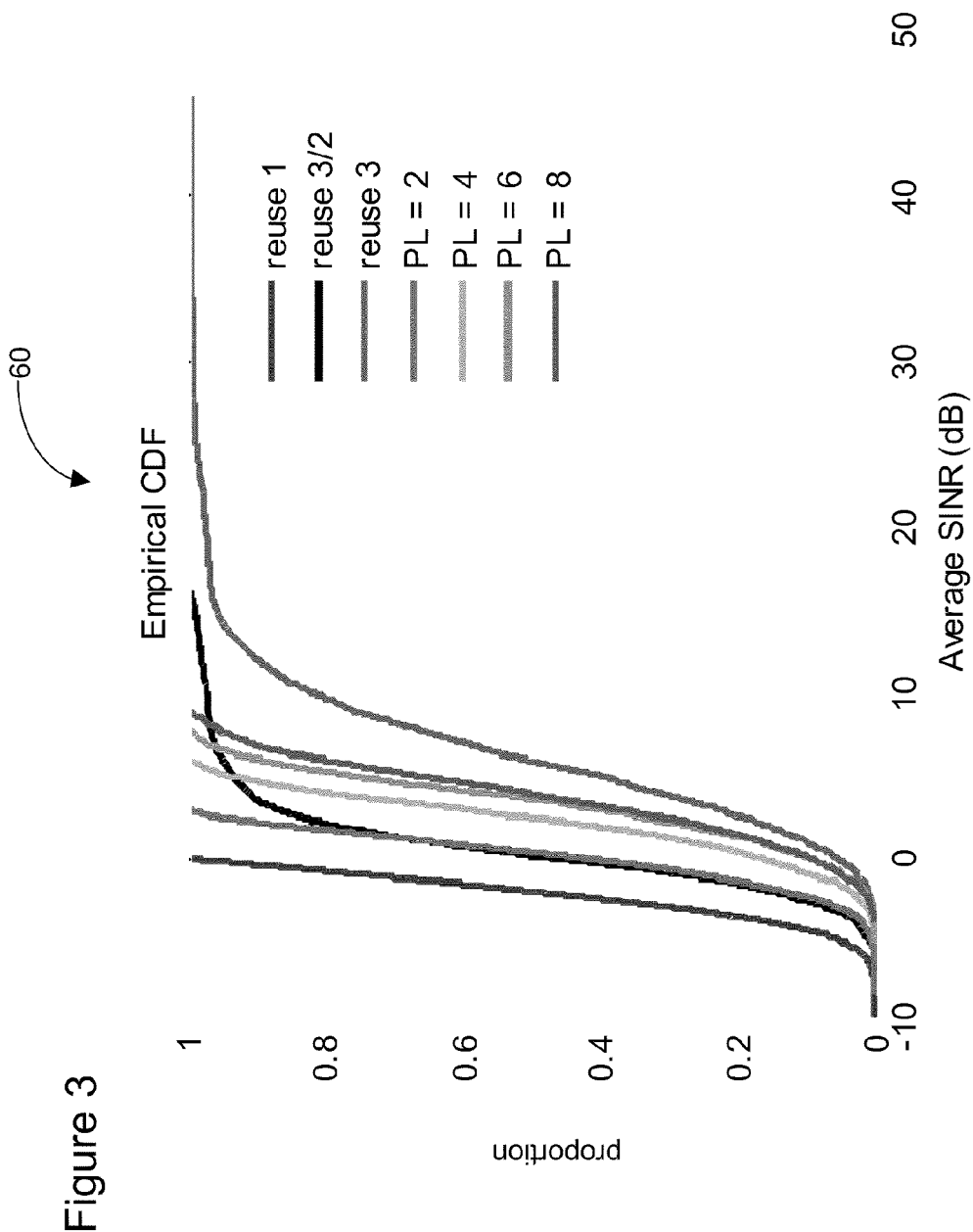
FIG. 3 is a a graph plotting a set of geometry signal-to-interference-plus-noise ratio (SINR) CDF curves for uniformly distributed users under soft and hard reuse schemes, according to some embodiments.

Analysis shows that there is an effective range of PL factors, which is helpful to guide the design. FIG. 3 is a graph 60 plotting a set of geometry signal-to-interference-plus-noise ratio (SINR) cumulative distribution function (CDF) curves for uniformly distributed users under soft reuse 3 and hard reuse 1, 3/2, and 3. In some embodiments, the FFR method 100 is interested in cell edge users. Hence, only users with a geometry SINR, under reuse 1, of below 0 dB are considered here. Further, the analysis shows that a PL of two (interference base station de-boosting of 3 dB) results in a geometry SINR similar to that of reuse 3/2, while a PL larger than eight (interference base station de-boosting of 9 dB) results in improved geometry SINR close to that of reuse 3. Thus, a range of PL=2 to PL=8 may be used as the effective range of the PL factor during system design.

Based on the reuse partition and power restriction mentioned above, the four sub-bands may be classified into three groups, according to different co-channel interference strengths experienced by users. FIG. 2 also depicts three adjacent cells in a wireless cellular network 50, cell 20A, cell 20B, and cell 20C.

Looking at the cell 20A, for example:

Boosted sub-band: sub-band 1. Its reuse is larger than 1 and will change along with a different PL factor. Reuse 3 will be the reuse factor upper bound when power boosting factor PL goes to infinity Sub-band with strong CCI: sub-bands 2 and 3. Its reuse is still 1 according to the traditional reuse definition, but actually it is equivalent to a reuse less than 1 due to having a worse geometry SINR compared with reuse 1. Users transmitting on those sub-bands will encounter stronger CCI because other users transmitting on them in neighbor cells will use higher power.

Sub-band with reuse 1: sub-band 4

Similarly, for cell 20C, the boosted sub-band is sub-band 2, the sub-bands with strong CCI are sub-bands 1 and 3, and the sub-band with reuse 1 is again sub-band 4. For cell 20B, the boosted sub-band is sub-band 3, the sub-bands with strong CCI are sub-bands 1 and 2, and the sub-band with reuse 1 is sub-band 4.

Thus, in order to support soft reuse based on this reuse partition, users are classified into three groups:

cell edge users, transmit in the boosted sub-band;

cell center users with great channel quality may be scheduled to transmit on the sub-band with a strong CCI since they have some margin to endure stronger interference all other users who have good channel quality may be scheduled to transmit on sub-band with reuse 1

This is shown in the cellular network 50 of FIG. 2. The cell edge users of cells 20A, 20B, and 20C use the boosted sub-bands 1, 3, and 2, respectively. The center cell users use the strong CCI sub-bands, either sub-band 2 or sub-band 3 for center cell users 22A in cell 20A, either sub-band 1 or sub-band 2 for center cell users 22B in cell 20B, and either sub-band 1 or sub-band 3 for center cell users 22C in cell 20C. The remaining middle cell users use sub-band 4, which is reuse 1.

In addition, the proposed soft reuse may work with two user groups when center users with great channel quality do not exist.

Dynamic User Grouping 150

In wireless cellular systems, different users have different channel conditions. In order to mitigate the strong co-channel interference experienced by cell edge users, all users are classified into different groups that may be scheduled on different partition groups. In some embodiments, the users are classified into cell edge user groups (EUG), cell middle user groups (MUG), and cell center user groups (CUG). As used herein, EUGs are users with poor channel conditions, MUGs are users with good channel conditions, and CUGs are users with great channel conditions.

In the FFR method 100, the dynamic user grouping 150 defines a metric, Degree of Satisfaction (DoS), to differentiate users into groups. DoS is relatively defined according to each user's quality of service (QoS) requirements. The DoS metric changes as the cell user moves or as traffic changes in the network. The changes may be dynamically captured by base stations so that users may be best served. The DoS metric may be defined based on the QoS requirements of each user. Examples are defining DoS as users' throughput in full buffer traffic scenarios or delay in voice over internet protocol (VoIP) scenarios. The DoS metric may be combined with a static metric (such as geometry SINR, position, etc.) to facilitate FFR algorithms.

In some embodiments, the dynamic user grouping 150 makes decisions on user classification at the base station side. The user grouping 150 differentiates between two kinds of grouping techniques, fixed percentage-based and threshold-based. With the fixed percentage-based grouping, the size of each user group is predefined based on the users' geometry SINR channel definition format (CDF) curve offline. Users are first sorted based on certain metrics and then classified into cell edge, middle, and center groups sequentially (i.e., using geometry SINR from low to high). The sorting metrics could be geometric SINR or user DoS. In the latter case, the user grouping is dynamically adjusted as its DoS varies online.

With threshold-based grouping, thresholds are predefined based on certain metrics to divide users into different groups. For example, users' geometry SINR or DoS could be used as metrics to define the threshold. If a full buffer model is assumed, then the DoS-based threshold classifies users as cell edge users if their throughputs are less than a certain threshold. User grouping is dynamically adjusted as the DoS of the user varies online. The number of groups is adjusted online between two and three, in some embodiments.

CQI Feedback Based on Reuse 180

Since with the proposed soft reuse technique, cell edge users tend to be scheduled with resources of a higher reuse factor or power level, while cell center users tend to be scheduled with resources of a lower reuse factor or power level, in some embodiments, users from different user groups are made aware of this information, enabling the users to smartly reduce the CQI feedback overhead while maintaining the gain on edge performance.

Figure 4:
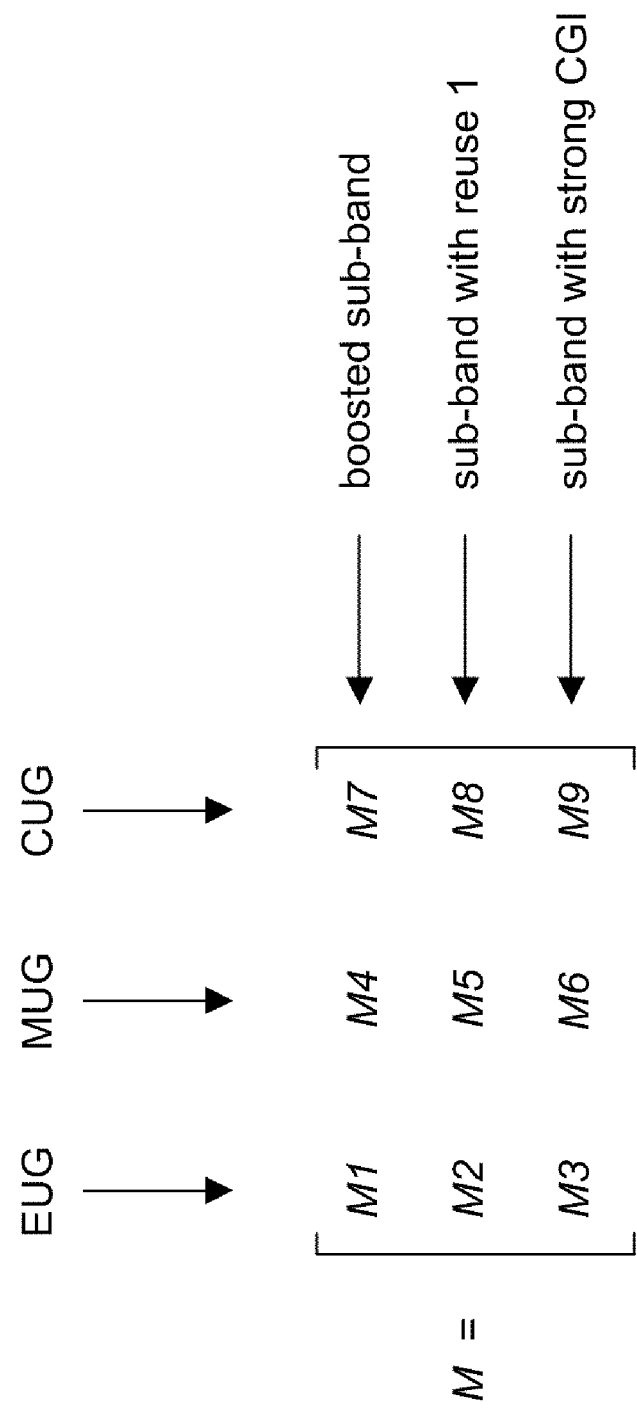
FIG. 4 is a diagram of a matrix M to be used by the FFR method of FIG. 1, according to some embodiments.

As mentioned above, frequency bands are divided into boosted sub-bands, sub-bands with strong CCI, and sub-bands with reuse 1. In some embodiments, the FFR method 100 designs CQI such that each subscriber station feeds back the CQIs on different reuse sub-bands separately, based on the interference level. To achieve this, a feedback pattern matrix M is used by the CQI feedback based on reuse module 180. The elements of the matrix M are the number of CQIs to be fed back for each one of the three types of sub-bands, as shown in FIG. 4. This method may be combined with best-M (or best-M with grouping) in implementation, where each subscriber station feeds back best-M CQIs of each sub-band with different interference levels separately and 'M' may be different in each sub-band for different user groups.

Figure 5:
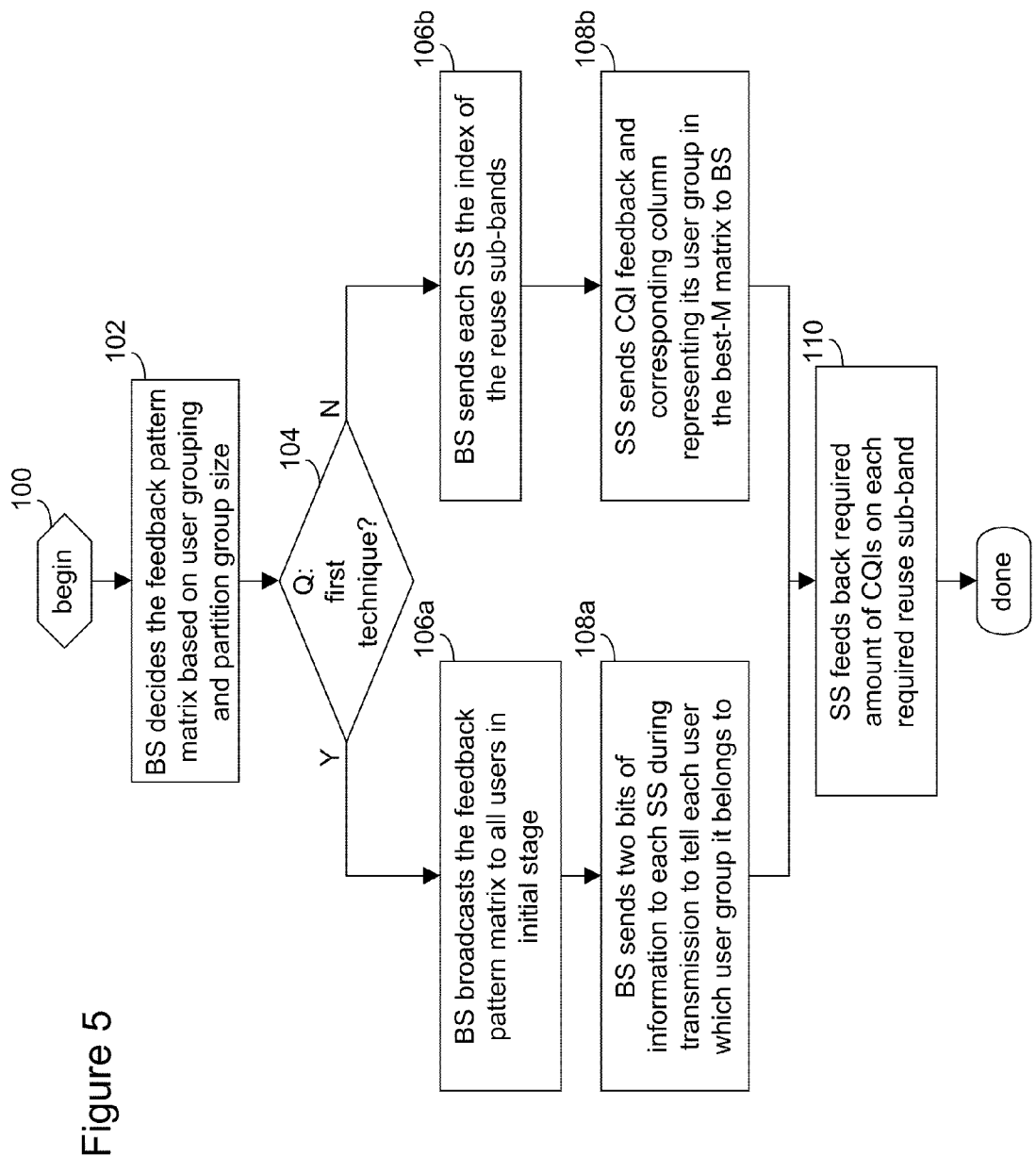
FIG. 5 is a flow diagram showing operations performed by the FFR method of FIG. 1, according to some embodiments.

FIG. 5 is a flow diagram showing the CQI feedback based on reuse module 180, according to some embodiments. First, the base station decides the feedback pattern matrix based on user grouping and partition group size (block 102). Subsequently, the base station (BS) sends the CQI feedback request to the subscriber station (SS) with information needed by the subscriber station. In some embodiments, the FFR method 100 uses one of two techniques (block 104). Under the first technique, the base station broadcasts the feedback pattern matrix to all users in an initial stage (block 106*a*). The base station then sends two bits of information to each subscriber station during transmission, which informs each user of its designated user group (block 108*a*). In some embodiments, a transmission of 00b by the base station indicates that the subscriber station is in an edge user group (EUG), a transmission of 01b indicates a middle user group (MUG), and a transmission of 10b indicates a center user group (CUG).

Where the second technique is used, the base station sends each subscriber station the index of the reuse sub-bands (block 106*b*). From this, the base station is relying on the subscriber station to send CQI feedback and the corresponding column representing its user group in the best-M matrix back to the base station (block 108*b*). Using either technique, the necessary information is conveyed to the subscriber station by the base station. Once this is done, the subscriber station feeds back the required amount of CQIs on each required reuse sub-band (block 110).

Group-Based Interference-Aware Scheduler 200

Figure 6:
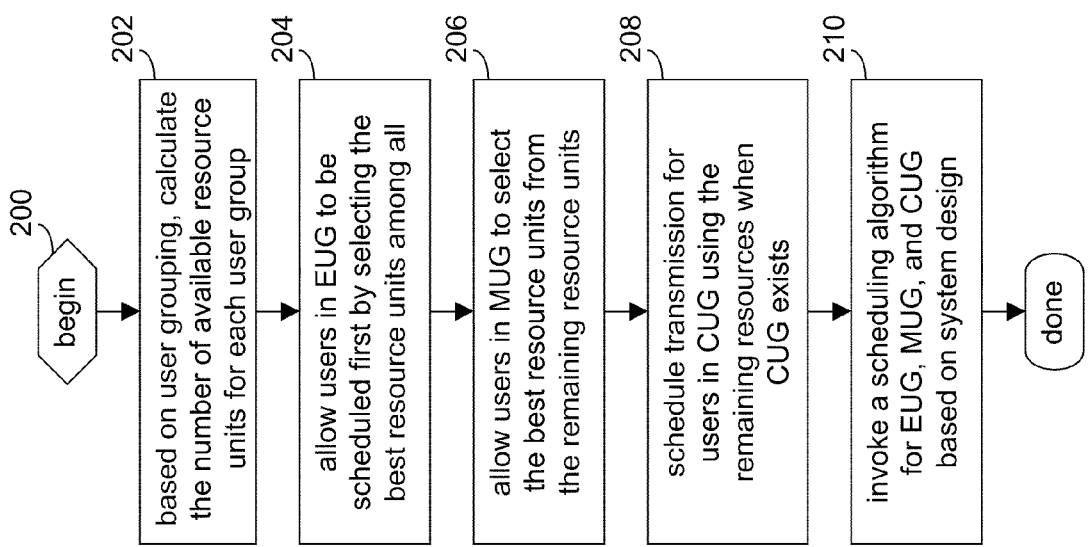
FIG. 6 is a flow diagram showing operations of the group-based interference-aware scheduler used by the FFR method of FIG. 1, according to some embodiments.

In some embodiments, the FFR method 100 also includes a group-based interference-aware scheduler 200. FIG. 6 is a flow diagram that details the operations performed by the scheduler 200. Based on user grouping, the interference-aware scheduler 200 calculates the number of available resource units for each user group (block 202). The number of available resource units may be, for example, proportional to the number of users in each of the three user groups.

The next three steps are operations performed by the group-based interference-aware scheduler 200 to allocate resources for users on a group-by-group basis. First, the scheduler 200 allows users in the EUG group to be scheduled first by selecting the best resource units among all (block 204). A first subset of the available resource units is selected for this purpose. In some embodiments, the number of selected resource units does not exceed the calculated number of resource groups (block 202). The scheduler 200 then allows users in the MUG group to select the best resource units from the remaining resource units (block 206). A second subset of the remaining available resource units is selected for this purpose. Again, in some embodiments, the number of selected resource units does not exceed the calculated number of resource groups. The scheduler 200 then schedules transmission for CUG users, if they exist, using the remaining resource units (block 208). Once all the groups have been scheduled, a scheduling algorithm is applied, in some embodiments, based on system design (block 210). In some embodiments, a proportional fairness scheduling algorithm is used. In other embodiments, a round-robin scheduling algorithm is used.

In some embodiments, users from one user group having the highest priority are scheduled within their corresponding resource partition group, while users from the other two groups are also scheduled if the resource in this partition group has not been exhausted. For example, if the user distribution is not uniform or heavily biased toward a certain type, these users may always borrow resource units from other groups. This allows the scheduler 200 to accommodate a fluctuation of user channel qualities, i.e. a change of EUG/MUG/CUG sizes. In addition, this may address the issue of unbalanced user distribution across cell/sector by allowing users from one group to borrow resources from an intra-cell point of view. Since the group-based interference-aware scheduler 200 schedules users in the sequence of the EUG, the MUG, and then the CUG, this guarantees that cell edge users' performance is improved, in some embodiments. Also, reuse factors are dynamically selected, especially for users in the EUG, because the reuse partition may be transparent to the scheduler 200, as when using proportional fairness, the scheduler may treat different reuse equivalently in resource allocation.

Performance Evaluation

The user group-based adaptive soft reuse technique of the FFR method 100 is evaluated based on a WiMAX system level simulator. The evaluation system is assumed to be of 100% load with full buffer data model, with ideal channel estimation. FIG. 7 features a table 30, which gives key simulation settings and scenarios used in the performance evaluation of the FFR method 100. For all simulations, the case is simulated with a 75% bandwidth assigned to soft reuse, and a PL factor of six (7.78 dB).

Figure 9:
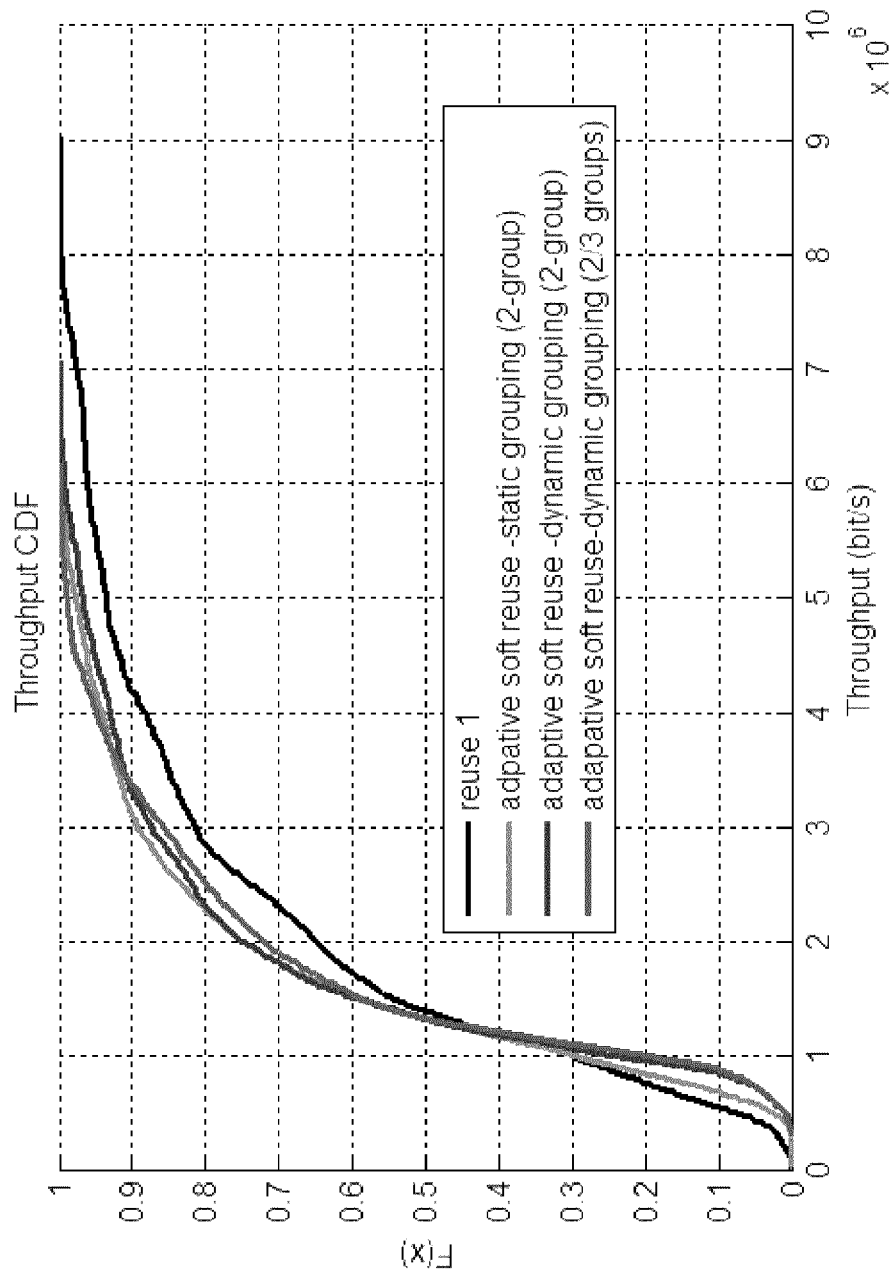
FIG. 9 is a graph that plots the throughput CDF curves corresponding to the performance results of FIG. 8, according to some embodiments.

FIG. 8 features a table 40 that lists the performance of adaptive soft reuse with full CQI feedback, according to some embodiments. FIG. 9 is a graph 70 that plots the corresponding throughput CDF curves, according to some embodiments. From the results, it may be observed that dynamic user grouping (based on throughput) that results from using the FFR method 100 significantly outperforms static user grouping (geometry SINR-based grouping) by providing an additional 28% gain on 5% user throughput and an additional 26% gain on 10% user throughput, while having an extra 4% gain on spectrum efficiency when using fixed percentage-based user grouping. In the fixed percentage-based user grouping, two-user groups are assumed and 30% of the users belong to the EUG, with the remaining users belonging to the MUG.

Also as shown in the table 40 (FIG. 8), threshold-based dynamic user grouping (with a threshold of 0 dB for the EUG and 17 dB for the CUG) brings approximately an additional 10% gain on both 5% user throughput and 10% user throughput, as compared to the fixed percentage-based method. This shows that a user grouping-based soft reuse may significantly boost the performance of traditional fractional frequency reuse at the cell edge (defined as the throughput CDF 5% percentile point and 10% percentile point) without loss of overall cell spectral efficiency. In some embodiments, more gain adaptively adjusting the user group number in an uneven user distribution is expected.

Figure 11:
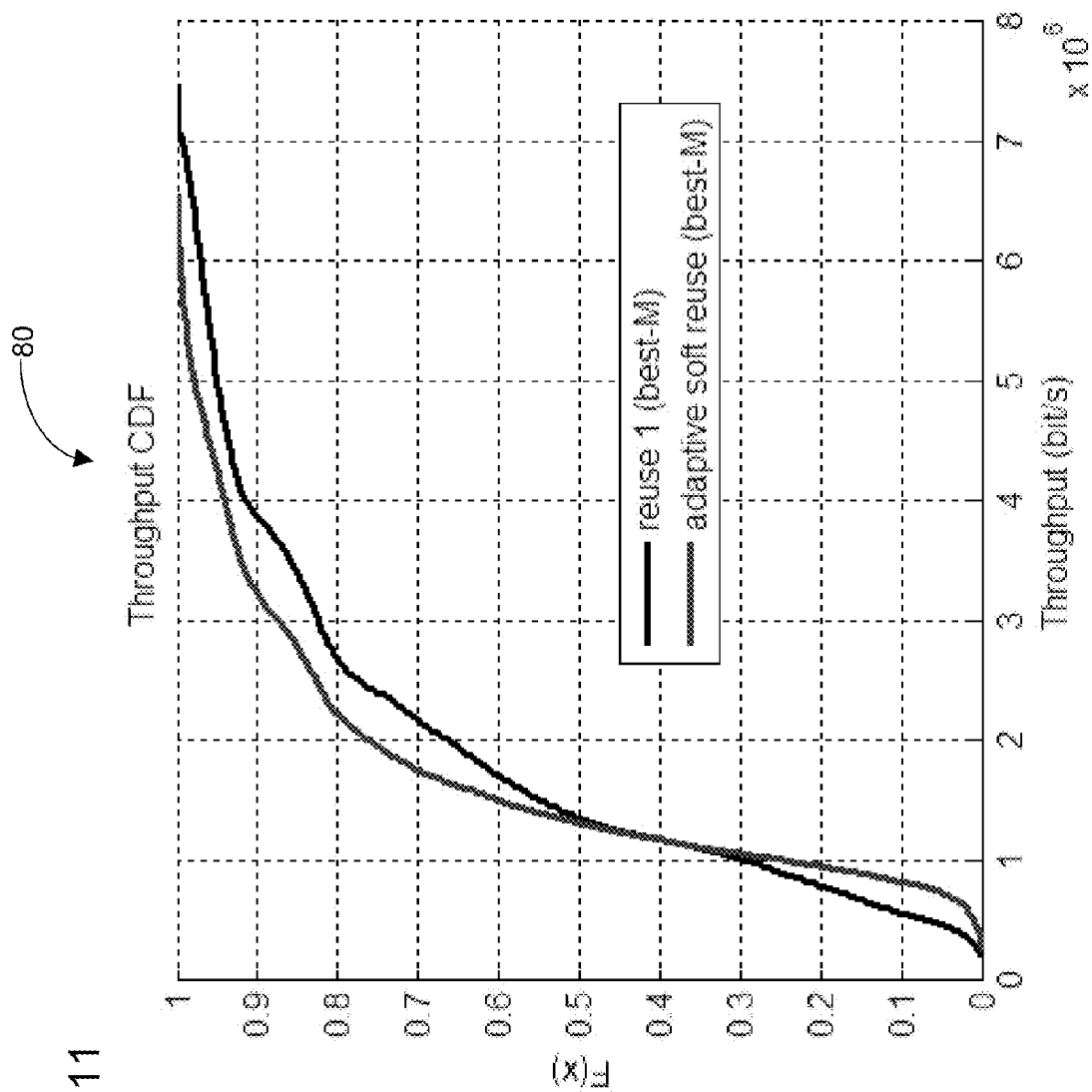
FIG. 11 is a graph plotting the throughput curves corresponding to the performance results of FIG. 10, according to some embodiments.

FIG. 10 features a table 60, which provides the performance of adaptive soft reuse technique, assuming partial feedback available at the base station, according to some embodiments. FIG. 11 is a graph 80 showing the corresponding throughput CDF. Assuming best-M, adaptive soft reuse with the proposed interference-aware CQI feedback reporting method of the FFR method 100 described herein may maintain the gain on both 5% and 10% user throughput, as compared to the full CQI feedback case, while not causing an obvious increase in the CQI overhead over a reuse 1 system (5.1 CQIs per user in soft reuse vs. 5 CQIs per user in reuse 1).

In summary, the FFR method 100 demonstrates the effectiveness of the invented user group-based adaptive soft reuse technique in three aspects: dynamic user grouping, adaptive user grouping by using a threshold to do user group number adjustment, and an interference-aware CQI feedback mechanism.

The advantage of the FFR method described herein as compared to other fractional frequency reuse methods is that the method 100 may achieve higher edge performance while maintaining similar spectrum efficiency. The FFR method 100 adapts to practical environments with unbalanced user distributions. An improved performance is achieved without having a significant increase in system design complexity, in some embodiments. The increases in downlink signaling and in CQI overhead are marginal compared with non-fractional frequency reuse systems. In addition, the FFR method 100 avoids dynamic interference from power loading.

The FFR method 100 may be adopted by the IEEE 802.16m standards committee. In some embodiments, the FFR method 100 is a mandatory option. The FFR method 100 may be used in OFDMA-based multiple-cell system designs, such as LTE, worldwide interoperability for microwave access (WiMAX), to mitigate interference and improve cell users' performance as well as coverage.

The FFR method 100 is novel in several aspects. The FFR reuse partition method 100 is a novel soft reuse scheme. The three-group-based user grouping is unique, as compared to prior art methods. Adaptively adjusting a number of user groups according to various user distributions, and classifying the users based on dynamic metric degree of satisfaction (DoS) has not been done in prior art methods. The degree of satisfaction metric takes the quality of service requirements of the users into consideration, and closely monitor if the user requirements have been met. Further, the FFR method 100 avoids allocating cell edge users more resources than they require. Therefore, system performance is optimized over prior art implementations, in some embodiments.

Also, CQI feedback based on the reuse partition is novel, as it may maintain a gain on the cell edge without introducing extra overhead. The interference-aware scheduler 200, a novel feature of the FFR method 100, provides a dynamic reuse factor selection among different groups and may handle uneven user distribution by borrowing resources from other reuse sub-bands inside each sector.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method, comprising:
partitioning, by a base station, a designated frequency band into a plurality of sub-bands, wherein each sub-band is assigned a reuse factor and a power level, wherein the frequency band is used for communication between the base station and one or more subscriber stations in a cellular network;
splitting, by the base station, each cell in the cellular network into at least two groups based on a degree of satisfaction metric obtained from each subscriber station, one of the groups being a cell edge user group, wherein the degree of satisfaction metric is defined relatively according to a quality of service (QoS) of each subscriber station in the cellular network and the subscriber stations occupying the at least two groups are adjusted dynamically by the base station according to changes in the QoS of each subscriber;
based on the at least two user groups, calculating, by the base station, a number of available resource units for each user group, wherein the number of available resource units for each user group is proportional to the number of subscriber stations in the user group; and
scheduling, by the base station, the cell edge user group before another user group of the at least two user groups using a best resource unit of the available number of resource units, subscribers in the cell edge user group to be assigned, by the base station, a boosted sub-band of the plurality of sub-bands, wherein the boosted sub-band has a reuse of greater than one and less than three;
wherein the interference to cells in the cell edge user group is mitigated;
creating a feedback pattern matrix to be populated with channel quality indicator information of the first sub-band, the second sub-band, and the third sub-band, the feedback pattern matrix comprising a first column for the cell edge user group, a second column for a cell middle user group, and a third column for a cell center user group, a first row for the first sub-band, a second row for the second sub-band, and a third row for the third sub-band;
broadcasting the feedback pattern matrix to subscriber stations in the cellular network; and
populating the feedback pattern matrix with channel quality indicator (CQI) information fed back from one or more subscriber stations located in each user group, wherein the CQI information is disposed in the feedback pattern matrix based on the location and sub-band assignment of the subscriber station;
wherein the CQI information in the feedback pattern matrix is used to allocate resource units to each subscriber station in each user group.

2. The method of claim 1, partitioning a designated frequency band into a plurality of sub-bands, wherein each sub-band is designated a reuse factor and a power level further comprising:
designating, by the base station, a first sub-band to have a reuse larger than one and a high power factor;
designating, by the base station, a second sub-band to have a strong co-channel interference; and
designating, by the base station, a third sub-band to have a reuse of one.

3. The method of claim 1, splitting each cell in the cellular network into at least two groups based on the degree of satisfaction metric obtained from each subscriber station further comprising:
arranging, by the base station, each cell from a low value to a high value based on the metric; and
assigning, by the base station, each cell user to one of the at least two groups.

4. The method of claim 3, splitting each cell in the cellular network into at least two groups based on the degree of satisfaction metric obtained from each subscriber station further comprising:
using, by the base station, a fixed percentage metric to split the cells.

5. The method of claim 3, splitting each cell in the cellular network into at least two groups based on the degree of satisfaction metric obtained from each subscriber station further comprising:
using, by the base station, a threshold-based metric to split the cells.

6. The method of claim 3, splitting each cell in the cellular network into at least two groups based on the degree of satisfaction metric obtained from each subscriber station further comprising:
using, by the base station, a geometric signal-to-interference-plus-noise ratio metric to split each cell.

7. The method of claim 3, splitting each cell in the cellular network into at least two groups based on the degree of satisfaction metric obtained from each subscriber station further comprising:
dynamically adjusting the user grouping, by the base station, as the degree of satisfaction of a cell changes.

8. The method of claim 1, scheduling the cell edge user group before another user group of the at least two user groups using the best resource units of the available number of resource units further comprising:
ensuring, by the base station, that the number of best resource units are proportional to the total number of resource units, with remaining resource units, not including the best resource units, being available for a next user group.

9. The method of claim 1, further comprising:
scheduling, by the base station, a next user group of the at least two user groups by selecting a second best of the remaining resource units, the remaining resource units not including the best resource units; and
continuing to schedule, by the base station, remaining user groups of the at least two user groups until all user groups have been allocated resource units.

10. The method of claim 1, further comprising:
broadcasting, by the base station, the feedback pattern matrix to all cells by the base station; and
informing, by the base station, each subscriber station of its designated cell user group.

11. The method of claim 10, informing each subscriber station of its designated cell user group further comprising:
sending, by the base station, a two-bit sequence to each subscriber station, wherein the two-bit sequence uniquely identifies the designated cell user group.

12. The method of claim 1, further comprising:
sending, by the base station, the index of the reuse sub-bands by the base station to each subscriber station; and
receiving, by the base station, channel quality indicator feedback and a corresponding column representing its user group in the feedback patter matrix from each subscriber station.

13. A method, comprising:
partitioning, by a base station, a designated frequency band into a boosted sub-band, a sub-band with strong co-channel interference, and a sub-band with a reuse factor of one, wherein the frequency band is used for communication between a base station and one or more subscriber stations in a cellular network, the cellular network comprising a plurality of cells, each cell comprising a base station;
dynamically grouping, by the base station, the one or more subscriber stations in the cellular network into a cell edge user group, a cell middle user group, or a cell center user group, based on geometry signal-to-interference-plus-noise of each of the one or more subscriber stations, the base station to notify each subscriber station of its assigned user group, wherein the cell edge user group comprises subscriber stations located at the edge of the cell, the cell center user group comprises subscriber stations located at the center of the cell, and the cell middle user group comprises all other subscriber stations in the cell that are not part of the cell edge user group or the cell center user group;
receiving, from each of the one or more subscriber stations, channel quality indicator information about M resource units in the user group assigned to the respective subscriber station, wherein M is an integer greater than one; and
allocating, by the base station, one or more resource units to each user group based on the received channel quality indicator information, wherein the number of resource units allocated to each user group is proportional to the number of subscriber stations in each user group;
wherein:
the boosted sub-band is to be used by subscriber stations in the cell edge user group;
the sub-band with strong co-channel interference is to be used by subscriber stations in the cell center user group; and
the sub-band with a reuse of one is to be used by subscriber stations in the cell middle user group;
creating a feedback pattern matrix to be populated with channel quality indicator information of the first sub-band, the second sub-band, and the third sub-band, the feedback pattern matrix comprising a first column for the cell edge user group, a second column for a cell middle user group, and a third column for a cell center user group, a first row for the first sub-band, a second row for the second sub-band, and a third row for the third sub-band;
broadcasting the feedback pattern matrix to subscriber stations in the cellular network; and
populating the feedback pattern matrix with channel quality indicator (CQI) information fed back from one or more subscriber stations located in each user group, wherein the CQI information is disposed in the feedback pattern matrix based on the location and sub-band assignment of the subscriber station;

wherein the CQI information in the feedback pattern matrix is used to allocate resource units to each subscriber station in each user group.

14. The method of claim 13, further comprising:

generating, by the base station, a feedback pattern matrix comprising channel quality indicator information about M resource units in the user group assigned to that subscriber station, wherein the feedback pattern matrix is organized into rows comprising the three sub-bands and columns comprising the three groups; and broadcasting, by the base station, the feedback pattern matrix to all subscriber stations in the cellular network.

15. The method of claim 14, further comprising:

updating the dynamic user grouping when the geometry signal-to-interference-plus-noise of one or more subscriber stations changes.

16. The method of claim 15, further comprising:

sending, by the base station, two bits to each subscriber station, the two bits each being a binary representation of the group designation, wherein a 00b indicates that the subscriber station is in the edge user group, a 01b indicates that the subscriber station is in the middle user group, and a 10b indicates that the subscriber station is in the center user group.

17. The method of claim 13, further comprising:

sending to each subscriber station the index of the three sub-bands by the base station; and receiving, by the base station, channel quality indicator feedback and corresponding column representing its group in a best-M matrix from each subscriber station.

18. A method, comprising:

partitioning, by a base station, a designated frequency band into a first sub-band, a second sub-band, and a third sub-band, wherein each sub-band is assigned a reuse factor and a power level, wherein the frequency band is used for communication between the base station and one or more subscriber stations in a cellular network;

assigning, by the base station, a plurality of subscriber stations in a cell of a cellular network as being in either a cell edge user group, a cell middle user group, and a cell center user group, each subscriber station in the cell being assigned based on a degree of satisfaction (DoS) of the subscriber station, the geometry signal-to-interference-plus-noise ratio (SINR) of the subscriber station, or a combination of DoS and geometry SINR of the subscriber station, wherein the cell edge user group comprises subscriber stations located at the edge of the cell, the cell center user group comprises subscriber stations located at the center of the cell, and the cell middle user group comprises all other subscriber stations in the cell that are not part of the cell edge user group or the cell center user group;

based on the grouping, calculating a number of available resource units for each user group by the base station;

selecting, by the base station, a best subset of the available resource units; and assigning the best subset, by the base station, to the cell edge user group;

creating a feedback pattern matrix to be populated with channel quality indicator information of the first sub-band, the second sub-band, and the third sub-band, the feedback pattern matrix comprising a first column for the cell edge user group, a second column for a cell middle user group, and a third column for a cell center user group, a first row for the first sub-band, a second row for the second sub-band, and a third row for the third sub-band;

broadcasting the feedback pattern matrix to subscriber stations in the cellular network; and populating the feedback pattern matrix with channel quality indicator (CQI) information fed back from one or more subscriber stations located in each user group, wherein the CQI information is disposed in the feedback pattern matrix based on the location and sub-band assignment of the subscriber station;

wherein the CQI information in the feedback pattern matrix is used to allocate resource units to each subscriber station in each user group.

19. The method of claim 18, further comprising:

selecting, by the base station, a second best subset of the available resource units;

assigning, by the base station, the second best subset to the cell middle user group; and assigning, by the base station, remaining available resource units to the cell center user group, wherein the remaining available resource units comprise the number of available resource units minus the sum of the best subset and the second best subset.

* * * * *